(12) United States Patent
Ramesh et al.

(10) Patent No.: US 11,683,831 B2
(45) Date of Patent: Jun. 20, 2023

(54) SYSTEMS AND METHODS FOR PROVIDING RESOURCE ANALYSIS FOR AUTONOMOUS MOBILITY ON DEMAND

(71) Applicant: Woven Planet North America, Inc., Los Altos, CA (US)

(72) Inventors: Anand Ramesh, Campbell, CA (US); Ioannis Petousis, Campbell, CA (US); Owen Davis, Campbell, CA (US); Christopher Heiser, Campbell, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 1185 days.

(21) Appl. No.: 16/208,418

(22) Filed: Dec. 3, 2018

(65) Prior Publication Data

US 2019/0174514 A1 Jun. 6, 2019

Related U.S. Application Data

(60) Provisional application No. 62/593,805, filed on Dec. 1, 2017, provisional application No. 62/734,482, filed on Sep. 21, 2018.

(51) Int. Cl.

| | |
|---|---|
| G06F 9/50 | (2006.01) |
| H04W 72/566 | (2023.01) |
| H04W 4/40 | (2018.01) |
| G06Q 10/02 | (2012.01) |
| G06Q 50/30 | (2012.01) |

(Continued)

(52) U.S. Cl.
CPC ........ *H04W 72/569* (2023.01); *G05D 1/0088* (2013.01); *G05D 1/0291* (2013.01); *G06F 9/5066* (2013.01); *G06F 9/5072* (2013.01); *G06Q 10/02* (2013.01); *G06Q 50/30* (2013.01); *G08G 1/202* (2013.01); *H04W 4/021* (2013.01); *H04W 4/027* (2013.01); *H04W 4/40* (2018.02); *G05D 2201/0213* (2013.01)

(58) Field of Classification Search
CPC .............................................. G06F 9/50–5094
See application file for complete search history.

(56) References Cited

U.S. PATENT DOCUMENTS 10,705,884 B2 * 7/2020 Altintas ................ G06F 9/4856
2007/0153802 A1 7/2007 Anke et al.
(Continued)

OTHER PUBLICATIONS

How to best deploy your Fog applications, probably Antonio Brogi, Stefano Forti, Ahmad Ibrahim (Year: 2017).*
(Continued)

*Primary Examiner* — Emerson C Puente
*Assistant Examiner* — Paul V Mills
(74) *Attorney, Agent, or Firm* — Christopher G. Darrow; Darrow Mustafa PC

(57) ABSTRACT

A system and method that enables resource analysis within an intelligent content absorption network with autonomous mobility implementations includes generating a prioritization model, training the prioritization model on a data corpus to generate a prioritization schedule, deploying the prioritization schedule to one or more autonomous vehicles, off-loading data at a local content absorption node, processing data at the local content absorption node, and optionally transmitting data results from the processed data.

20 Claims, 6 Drawing Sheets

(51) Int. Cl.
*H04W 4/021* (2018.01)
*H04W 4/02* (2018.01)
*G05D 1/00* (2006.01)
*G05D 1/02* (2020.01)
*G08G 1/00* (2006.01)

(56) References Cited

U.S. PATENT DOCUMENTS

| | | | |
|---|---|---|---|
| 2012/0215893 A1* | 8/2012 | Bisdikian | G06F 9/5011 709/223 |
| 2013/0274950 A1 | 10/2013 | Richardson et al. | |
| 2015/0244826 A1* | 8/2015 | Stenneth | H04L 67/568 709/213 |
| 2017/0032589 A1 | 2/2017 | Zagajac et al. | |
| 2018/0048532 A1* | 2/2018 | Poort | H04L 47/70 |
| 2019/0116511 A1* | 4/2019 | Wu | H04B 17/309 |
| 2020/0137142 A1* | 4/2020 | Salles | H04L 67/10 |

OTHER PUBLICATIONS

Deploying Fog Applications: How Much Does it Cost, by the Way? Antonio Brogi, Stefano Forti and Ahmad Ibrahim (Year: 2018).*
A Performance Simulation Tool for the Analysis of Data Gathering in Both Terrestrial and Underwater Sensor Networks Mukhtar Ghaleb, Emad Felemban3 Shamala Subramaniam, Adil Sheikh and Saad Bin Qaisar5, (Year: 2017).*
UAVFog A UAV-Based Fog Computing for Internet of Things Nader Mohamed, Jameela Al-Jaroodi2, Imad Jawha, Hassan Noura, and Sara Mahmoud (Year: 2017).*
Vehicle as a Resource (VaaR) Sherin Abdelhamid, Hossam S. Hassanein, and Glen Takahara (Year: 2015).*
Virtual Vehicle Coordination for Vehicles as Ambient Sensing Platforms Shangguang Wang, Qinglin Zhao 2, Ning Zhang3, Tao Lei, and Fangchun Yang (Year: 2018).*
CarTel: A Distributed Mobile Sensor Computing System Bret Hull, Vladimir Bychkovsky, Yang Zhang, Kevin Chen, Michel Goraczko, (Year: 2006).*
QoS-Aware Deployment of IoT Applications Through the Fog Antonio Brogi and Stefano Forti (Year: 2017).*
Sensors as a Service in the Cloud Eduard Montserrat Universitat Politècnica de Catalunya (Year: 2015).*
CESense: Cost-Effective Urban Environment Sensing in Vehicular Sensor Networks Quan Yuan, Haibo Zhou, Zhihan Liu, Jinglin Li (Year: 2018).*
Data Gathering in Wireless Sensor Networks with Mobile Collectors Ming Ma and Yuanyuan Yang (Year: 2008).*
Supporting Application Deployment and Management in Fog Computing Stefano Forti (Year: 2018).*

* cited by examiner

200 

```
┌─────────────────────────────────────────────┐
│   Generating Prioritization Schedule S210   │
└─────────────────────────────────────────────┘

┌─────────────────────────────────────────────┐
│    Receiving a Prioritization Request S215  │
└─────────────────────────────────────────────┘

┌─────────────────────────────────────────────┐
│  Identifying a Disposition for Collected Data S220  │
└─────────────────────────────────────────────┘

┌─────────────────────────────────────────────┐
│     Implementing Content ID Algorithms S225 │
└─────────────────────────────────────────────┘

┌─────────────────────────────────────────────┐
│  Processing Selected Data Elements of Data Corpus │
│                    S230                     │
└─────────────────────────────────────────────┘
```

Generating Prioritization Model S310

Training Prioritization Model on Data Corpus to Generate Prioritization Schedule S320

Deploying Prioritization Schedule to One or More Vehicles S330

Offloading Data at Local Content Absorption Node S340

Processing Data at Local Content Absorption Node S350

Transmitting Data Results From Processed Data S360

500

Receiving a Resource Analysis Request Including Constraints S510

Generating Prioritization Schedule Based on Constraints S520

Executing Deployment Simulation to Generate Resource Analysis Results S530

Processing Resource Analysis Results S540

Transmitting Processed Resource Analysis Results S550

SYSTEMS AND METHODS FOR PROVIDING RESOURCE ANALYSIS FOR AUTONOMOUS MOBILITY ON DEMAND

CROSS-REFERENCE TO RELATED APPLICATIONS

This application claims priority to U.S. Provisional application Ser. No. 62/593,805, filed 1 Dec. 2017 and U.S. Provisional application Ser. No. 62/734,482, filed 21 Sep. 2018, both of which are incorporated in their entirety by this reference.

TECHNICAL FIELD

This invention relates generally to the computing and data storage architecture field, and more specifically to a new and useful computing and data storage architecture for providing resource analysis for autonomous mobility on demand in an efficient manner in the computing and data storage architecture field.

BACKGROUND

Modern computing and data architectures have transitioned from local computing and storage schemes to remote and offsite computing and storage via distributed computing systems (e.g., the cloud). While these remote and distributed architectures may typically be useful in implementing traditional computing needs in which content stored at the remote distributed computing systems are distributed to edge devices (e.g., personal computers, mobile devices, etc.), these remote computing and data storage architectures do not function efficiently for edge computing devices that generate very large amounts of data and that require off-loading of the very large amounts of data to remote distributed environments such as public or private cloud instances.

That is, in circumstances in which a high-data generating edge device, such as an autonomous vehicle, is routinely generating and/or capturing very large sums of data (e.g., 40 terabytes of data per hour or greater) rather than consuming very large sums of data, storage and processing of the generated data becomes a significant technical problem. Specifically, onsite storage of significant data amounts at an autonomous mobility implementation generated over multiple cycles is unfeasible and transmitting large sums of data from an autonomous mobility edge device to a remote storage scheme (e.g., the cloud) over a communication network may be severely limited by insufficient bandwidth.

In addition, when looking at the deployment of applications generally, an associated cost function typically exists such that the closer the vehicle is in proximity to the cloud infrastructure the application communicates with, the more efficient it becomes to execute a given workflow. The cost of deployment is therefore at its lowest point within the heart of the cloud infrastructure. However, this cost function changes when applications are deployed on autonomous vehicles and for autonomous mobility tasks. In such a context, the applications run on data collected during operation of the autonomous vehicle, which is a significant amount of data collected in a given time. The data rate increase at the edge will therefore outstrip any infrastructure investment considered feasible. The problem in this situation becomes determining how to take the data and applications used for autonomous vehicles and orchestrate them to the right location for the best possible outcome in terms of data offloading and processing to provide an optimally low computational expenditure.

Thus, there is a need in the computing and data storage architecture field to create new and useful systems and methods that seek to alleviate the computing and data storage constraints at autonomous mobility implementations. The below-described embodiments of the present application provide an advanced computing and data storage architecture that addresses at least the above-noted technical problem as well as the problems described expressly or implicitly within the description of the present application.

BRIEF DESCRIPTION OF THE FIGURES

FIG. 2 illustrates an example of the method in accordance with one or more embodiments of the present application;

DESCRIPTION OF THE PREFERRED EMBODIMENTS

Figure 1:
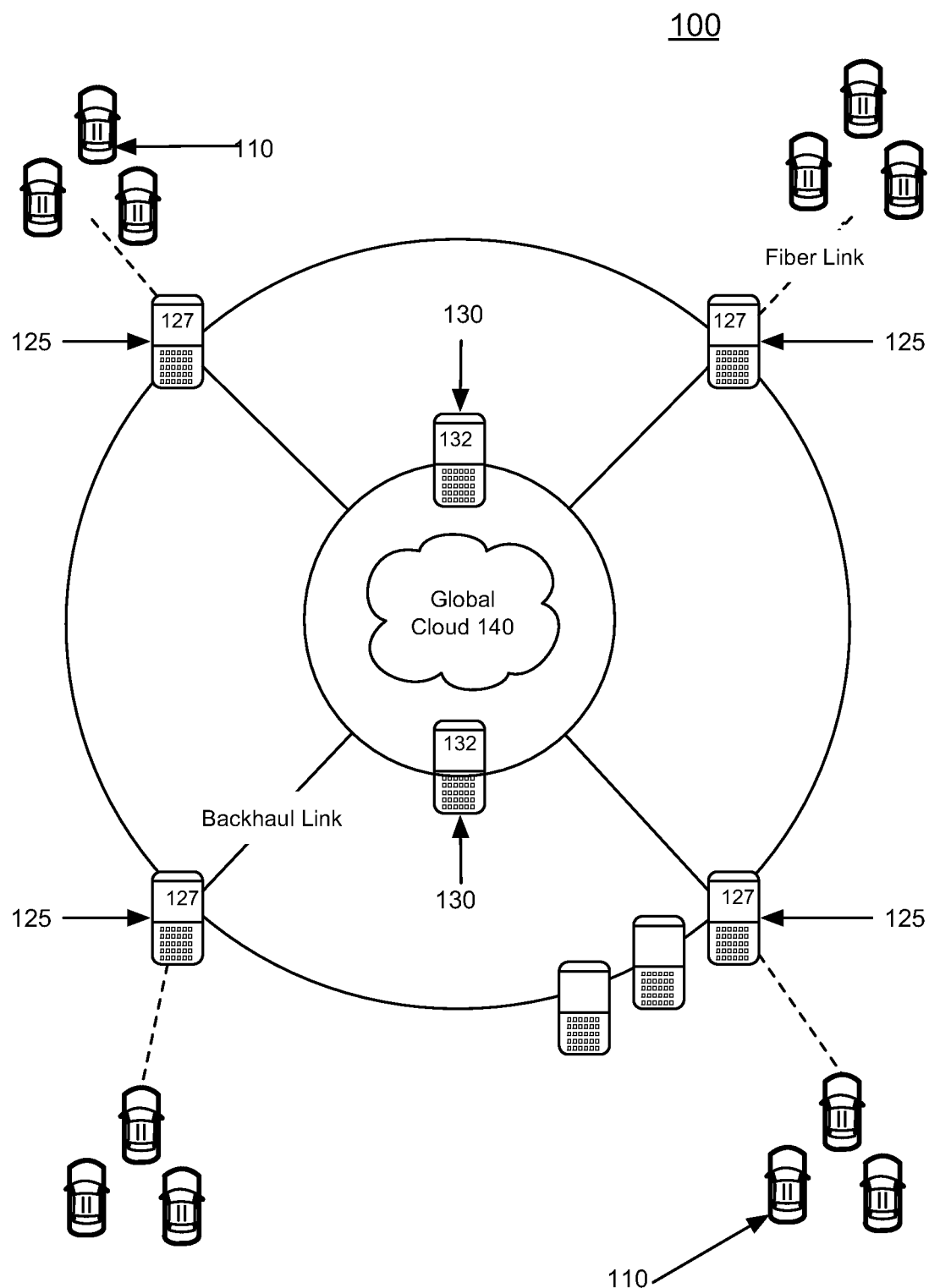
FIG. 1 illustrates a system 100 in accordance with one or more embodiments of the present application.

The following description of the preferred embodiments of the present application are not intended to limit the inventions described herein to these preferred embodiments, but rather to enable any person skilled in the art to make and use these inventions.

Overview

As discussed above, a significant need for local data acquisition (or storage) and local computing systems is becoming apparent for autonomous mobility implementations, and particularly in the space of autonomous mobility on demand (e.g., autonomous rideshare vehicles, etc.). The current computing and data acquisition/storage architectures do not adequately address the technical difficulties in offloading and transmitting large volumes of data generated by these autonomous mobility implementations.

In operation, autonomous mobility implementations, such as fleets of autonomous vehicles generate substantial amounts of data that are virtually inconsumable by existing local networks and associated local infrastructure. Specifically, components of autonomous implementations (e.g., sensors, computing systems, navigation systems, etc.) cooperatively generate too much data during operating sessions to practically transfer (e.g., economically, physically limited, etc.) to remote systems over conventional communication infrastructure. The amount of data can be so large that even on-board storage may be untenable. For instance, in a daily operation cycle, it is often possible that an autonomous mobility vehicle or the like may acquire approximately forty (40) terabytes of data or more but existing wireless communication networks (e.g., 3G, 4G, 5G, LTE, etc.) may only enable a one-gigabit or a high speed uplink that cannot possibly transmit 40 TB in the normal course of operating an autonomous vehicle.

Accordingly, as autonomous mobility on demand continues to increase in popularity of use, a resulting effect or proposed solution to accommodate the associated increase in data generation by fleets of autonomous mobility implementations has been the increased creation and/or construction of remote data centers (e.g., cloud service centers) for storing data generated by the autonomous mobility implementations. However, this may be unsustainable as it is improbable that even with the creation of additional remote data centers to store the massive amounts of data generated by autonomous mobility implementations can such remote data centers keep pace with the seemingly exponential growth of autonomous mobility on demand. In any case, even if created, these potential additional remote data centers fail to address a fundamental issue in the transmission of such large amounts of data over bandwidth constrained local networks.

The several embodiments of the present application, however, provide technical solutions to ameliorate the severe constraints in managing the temporary and long-term data storage and transmission of large amounts of data produced by autonomous mobility implementations. Generally, the embodiments of the present application propose an inversion of the typical cloud implementation and edge computing, in that, parts of the systems and methods described herein function to generate large amounts of data at the edge (or in a local environment), absorb these large volumes of data at the edge, as well as compute against the large volumes of data at the edge (e.g., locally) for generating meaningful system control inputs, useful data, useful analysis, and the like. In this type of system architecture, content in most implementations may be absorbed rather than consumed at the edge by computing nodes and content distributed from the edge to central repositories (or regional and global cloud centers).

Specifically, embodiments of the present application function to implement content absorption and computation nodes in a geographically local operating environment of autonomous mobility implementations. Thus, the embodiments of the present application provide significant data offloading destinations and data computation destinations at a same level of the data generating sources (e.g., the autonomous mobility implementations). When compared to the typical or existing cloud infrastructure and systems, the architecture(s) of the embodiments of the present application differ in at least two meaningful ways.

First, in the embodiments of the present application, large volume data extraction resources are disposed at or near the data-generating autonomous mobility implementations thereby enabling rapid divesture of on-board data via, at least, wired or physical connections between the autonomous mobility implementations and a local content absorption node (e.g., a computing server optionally with power supplying (charging) capabilities) rather than a slow and bandwidth constrained data uplink to a remote cloud facility. Second, in the embodiments of the present application high value computing resources (e.g., the content absorption nodes) are disposed at or near the data-generating autonomous mobility implementations thereby enabling computer resource-intensive and meaningful computations of the collected data to occur locally (in real-time) rather than at a remote data center. These local computations of data from the autonomous mobility implementations enable real-time or near real-time (e.g., within 1-60 seconds or the like) data management decisioning by the local content absorption node that may function to reduce data transmission requirements to a large remote data center as well as allow for identification of meaningful insights from the extracted data much sooner than in the circumstances in which the data is transmitted to and later processed the remote data center.

Additionally, one or more embodiments of the present application may function to implement regionally and/or globally-aware scheduling and control layers that function to consume data inputs obtained throughout the local edges (e.g., the autonomous mobility implementations, near-vehicle computing/storage instances, etc.) of the system as well as external data inputs to generate scheduling controls that may be implemented at the edge computing devices existing at the local levels of the system. The globally-aware scheduling and control layers of the one or more embodiments of the present application may additionally function to implement a global scheduler that spans autonomous mobility environments, near-autonomous mobility environments, and cloud environments. The globally-aware scheduling layer can also be used as a centralized means to process and serve data based on signals (e.g., urgency, networking latency, utilization, and cost). The edge links (e.g., the local content absorption nodes and the like) in these one or more embodiments may also function to perform time-sensitive (urgent) tasks and deliver (software) updates and act as temporary caches specific to a region or other locality.

Benefits

This method can confer several benefits over conventional data processing and offloading methods.

First, the method handles computational capacity within vehicles as a schedulable resource. A certain amount of computational capacity is deployed onto an autonomous vehicle. The operational principles of autonomous mobility on demand require a computational workload that makes decisions regarding object detection, pathfinding, and other tasks. Instead of being treated as typical computing resources, the method includes scheduling and prioritization of these resources in the context of the specific data processing constraints of autonomous vehicles.

Second, the method allows data and computational resources to be provisioned for other uses at given times when they are not needed for the primary use in question. Underutilized resources can potentially be schedulable for other tasks, including offline processes at various times.

Third, the method takes advantage of local data processing capacity, including the ability for vehicles to return to a charging station for recharging, processing data, and offloading data at a much higher capacity and with less expense of resources than if the vehicle data were to be offloaded remotely to the cloud via wi-fi or cell networks. For example, the scheduling aspects of the method allow for local data offloading to be optimized in conjunction with data collection and data processing throughout a given day or task.

Fourth, the method provides users, applications, and devices to receive information on what the expense of a desired operation would be before the operation is performed within a network. The method also provides information on what the optical location or schedule would be for offloading data for a given operation. The method can execute a deployment simulation based on a set of constraints for an operation, and provide analytics and informational results relating to executing the operation.

However, this method can confer any suitable set of benefits.

1. System for Implementing an Intelligent Content Absorption Network

As shown in FIG. 1, a system 100 for implementing a content absorption network includes a plurality of autonomous and/or mobile implementations 110, one or more instances of local content absorption nodes 125, a regional cloud 130, and a global analysis cloud 140.

The system 100 functions to provide a data acquisition and computing architecture that enables the local collection of the large volumes of data from autonomous mobility implementations. At one level, the system 100 provides a plurality of local content absorption nodes 125 that function to collect data from autonomous mobility implementations and perform one or more compute operations to the collected data prior to distributing a derivative of the collected data to an affiliated regional cloud 130 and/or global analysis cloud 140 presence. Each of the local content absorption nodes may be implemented by one or more computers or computing servers. It shall be noted that each of the local content absorption nodes may function to serve many data-generating instances operating in the local environment and thus, instances of the local content absorption nodes operating together may scale to serve a high number of data-generating instances.

Additionally, the system 100 may also function to enable external requests from third parties and/or managers of fleets from autonomous mobility implementations to be made on the plurality of local content absorption nodes 125 that informs one or more scheduling decisions by one or more scheduling modules of the plurality of content absorption nodes 125 as well as a scheduling module of the autonomous mobility implementations. The combination of the local distribution of local content absorption nodes 125 together with intelligent scheduling mechanisms of the system 100 reduces and/or ameliorates the bandwidth constraint issues in uploading data and also, provides an efficiency mechanism for satisfying requests against the autonomous mobility implementations 110 and local content absorption nodes 125.

Figure 1A:
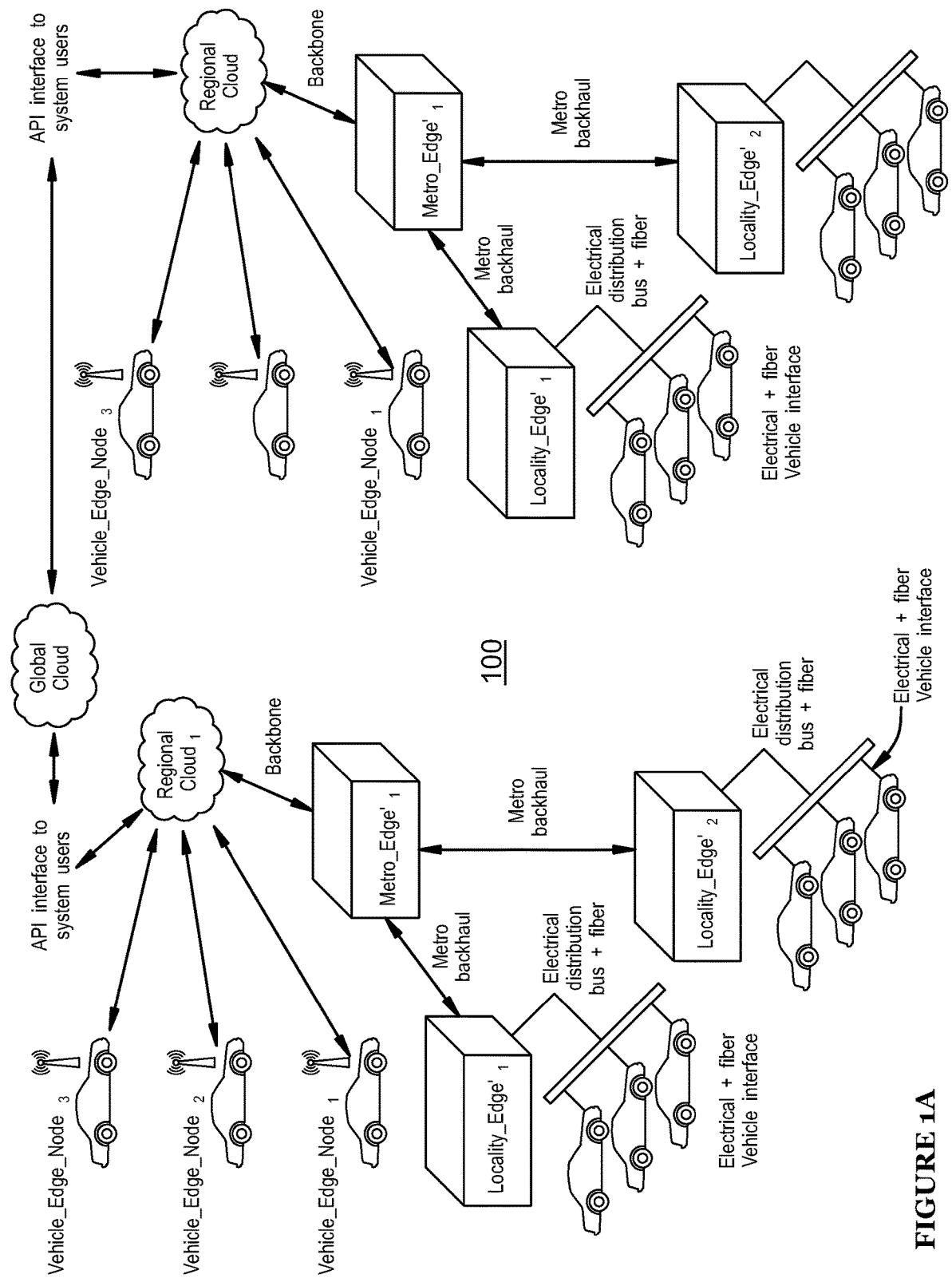
FIG. 1A illustrates an exemplary topology of an autonomous mobility on demand cloud architecture system in accordance with one or more embodiments of the present application.

Additionally, each of the local content absorption nodes 125 may include an autonomous mobility interface that enables autonomous mobility implementations 110 to interact and/or (physically or wirelessly) connect with a local content absorption node. The autonomous mobility interface preferably comprises a fiber connection or fiber interface. Each of the local content absorption nodes 125 may additionally have a high bandwidth backhaul connection to core network components, such as a metro edge computing node, as shown by way of example in FIG. 1A, or be connected to a backbone network to a remote regional datacenter.

In an exemplary configuration of the system 100, an outer edge of the content absorption network of system 100 may include the plurality of autonomous mobility implementations 110 (or fleets) capable of interacting with one or more instances of local content absorption nodes 125. At this outer edge of the topology of system 100, data offloads from the plurality of autonomous mobility implementations 110 to the local content absorption node(s) 125. All, subset, or processed derivatives of the raw data generated by the autonomous mobility implementations 110 (e.g., edge nodes) can be passed to one or more of the local content absorption nodes 125 or regional clouds 130. In one variation, each autonomous mobility implementation 110 can be assigned to and/or controlled by a single regional cloud 130 that controls autonomous mobility implementation 110 operation parameters (e.g., scheduling, streamed data, etc.). In a second variation, each autonomous mobility implementation 110 can be assigned to and/or controlled by multiple regional clouds 130, wherein conflicting instructions can be determined based on: a regional cloud priority list, autonomous mobility implementation 110 physical proximity to each instructing regional cloud 130 (e.g., based on the autonomous mobility implementation 110's GPS, based on the communication node or station identifier, etc.), and/or otherwise determined. In a specific example, each autonomous mobility implementation 110 is running an edge node scheduling engine (e.g., a vehicle scheduling engine), wherein the edge node scheduling engine can communicate with higher-level schedulers executing in higher architectural levels (e.g., the regional clouds, the local content absorption nodes, the global cloud, etc.). Each autonomous mobility implementation 110 can additionally or alternatively communicate with other autonomous mobility implementation 110 (e.g., form a predetermined or ad-hoc mesh, etc.) to obtain information for local processing, to relay data to a higher-level architectural layer (e.g., when bandwidth costs are over a predetermined threshold or other networking conditions are satisfied), or for other purposes.

At an intermediate inner layer of the exemplary configuration of system 100 may additionally include a plurality of regional clouds 130. For each locality (e.g., city, town, municipality, metro area, etc.), there may include one or more instances of local content absorption nodes 125 each of which being in operable control communication via (metro area) backhaul links (or the like) with a regional cloud 130. The regional cloud 130 may include a moderately-sized data center that functions to store and/or manage data from select localities and/or metro areas. The regional cloud 130 may implement a regional scheduler module 132 and include artificial intelligence capabilities that enable the regional cloud scheduler to intelligently operate with and/or control one or more local resources.

Figure 4:
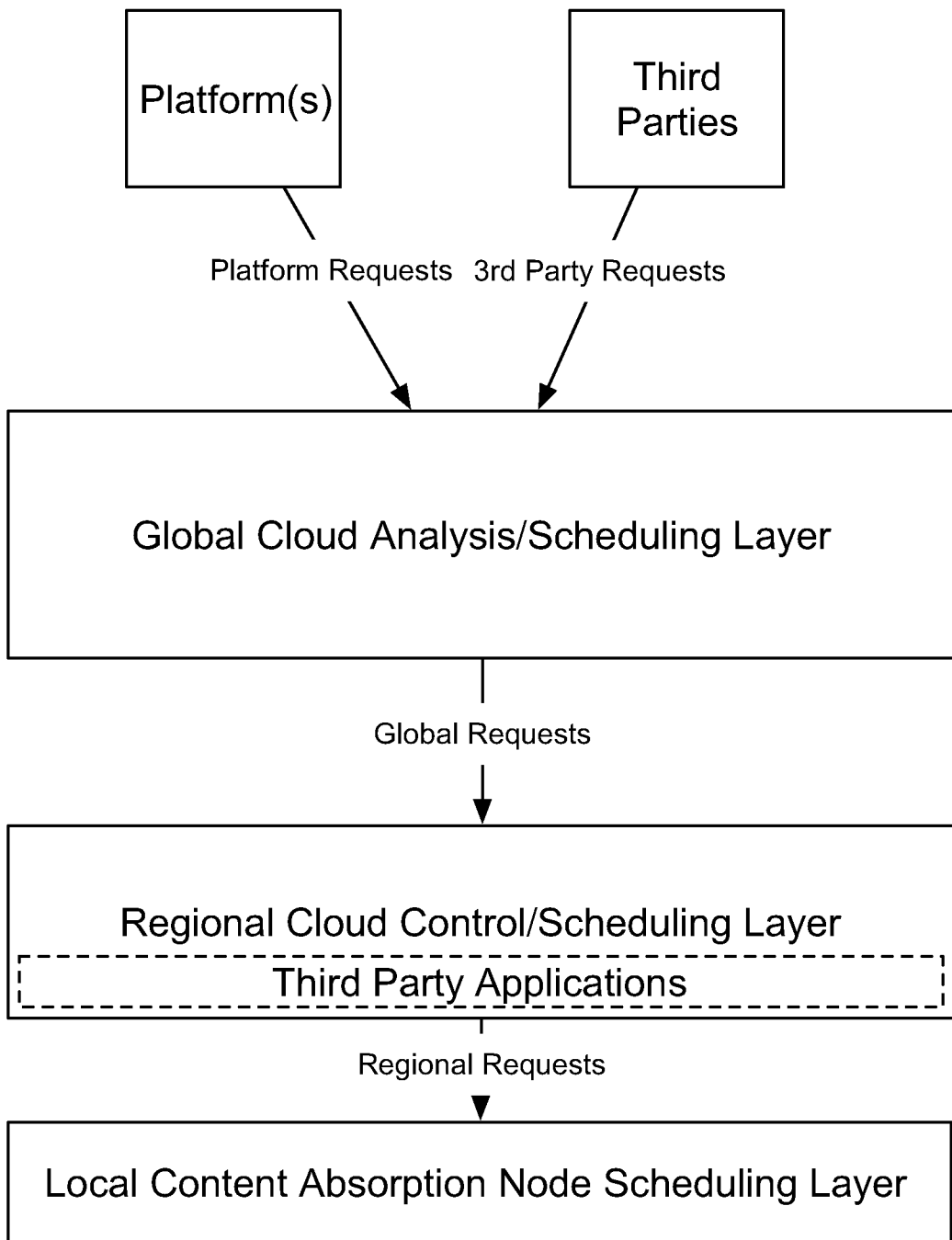
FIG. 4 illustrates a schematic representation of an exemplary topology of an autonomous mobility on demand cloud architecture in accordance with one or more embodiments of the present application.

Generally, the regional cloud 130 may be a regionally-aware entity that is aware of the computing resources (e.g., local content absorption nodes, autonomous mobility implementations, etc.) within its control or command purview. The regional cloud 130 may function to perform mid-level or regional analysis based on streams of data passed from upstream local sources, as well as lateral regional sources, such as other regional clouds. Additionally, as shown in FIG. 4, third party applications may run at the regional cloud. In variants, the regional cloud 130 can execute a regional scheduling engine configured to monitor compute, storage and networking resources (e.g., for the region, between the regional cloud 130 and the autonomous mobility implementations 110 associated with the respective regional cloud 130), and assigning workloads to the various computing units (e.g., autonomous mobility implementation 110, local content absorption nodes 125).

The regional cloud 130 may generally function as a data aggregation destination for data generated by the plurality of autonomous mobility implementations 110. The aggregated data and resulting analysis of the data by the regional cloud 130 may be used to improve various operation aspects of the control functions or operations of regional cloud 130 (e.g., the control layer), including but not limited to operations, such as object recognition, improved control by an artificial intelligence layer of the regional cloud, and an overall reduction in computing costs and inefficiencies of the plurality of autonomous mobility implementations 110 associated with the system 100. As mentioned above, the regional cloud 130 may implement one or more intelligent algorithms including trained machine learning algorithms to implement the regional scheduler 132 and further, make inferences including predictive suggestions or inferences about a state of a regional autonomous mobility environment. The regional cloud 130 may be implemented by a plurality of computing devices including a plurality of distributed computing systems or one or more of a combination of private, public, and/or hybrid computing servers.

An innermost layer or core of the exemplary configuration of system 100 may include a centralized global analysis cloud 140 that may be in operable control communication with each of the regional clouds 130 of the system 100. In some embodiments, the global analysis cloud 140 may be a virtualized entity that may physically reside and operate in one or more geographic areas. Generally, the global analysis cloud 140 may be a globally-aware entity that is aware of the computing resources (e.g., regional clouds, local content absorption nodes, autonomous mobility implementations, etc.) within its control or command purview. The global analysis cloud 140 may function to perform high-level or global analysis based on streams of data passed from downstream regional sources, as well as lateral and/or upstream sources, such as other global analysis clouds and external (or third-party) data feeds (e.g., weather feeds, traffic feeds, emergency feeds, news feeds, electrical grid information feeds, etc.). The data processed by the global analysis cloud 140 can be anonymized (e.g., by the autonomous mobility implementation 110, the local content absorption nodes 125, the regional cloud 130, etc.), or include indentifying information. The global analysis cloud 140 may implement one or more intelligent algorithms including trained machine learning algorithms, such as deep learning or similar techniques, to make inferences including predictive suggestions or inference about a global state of an autonomous mobility environment of the system 100. In a preferred embodiment, the global analysis cloud 140 may function to implement a distributed and/or federated machine learning model that may be deployed in different layers of the system 100. The distribution of the machine learning model may be based on factors, such as data privacy, availability and cost of computing resources, and/or useful of centralized learning methods and the like.

The global analysis cloud 140 may be in communication with a plurality of other global analysis clouds that are distributed worldwide or generally, in a large geographic area (e.g., a national area). The global analysis cloud 140 may function to implement a global scheduling layer or module 142 that enables a control of the regional cloud resources accessible to the global analysis cloud 140. The global scheduling layer or module 142 may function to interact and/or receive data feeds (e.g., weather, traffic, accidents, construction, etc.) and/or requests for various global and local sources that allows the global analysis cloud 140 to generate high-level operating instructions and computing-task allocations instructions that are distributed to the regional cloud 140 resources under the management of the global analysis cloud 140.

Some embodiments include multiple local content absorption nodes 125. Each of the local content absorption nodes 125 may function as a physical interaction point (e.g., autonomous mobility interface) for each of the plurality of autonomous mobility implementations 110. That is, member content absorption nodes 125 may be distributed in a locality or metro area such that the autonomous mobility implementations operating in a locality (e.g., a city or town) or metro area may physically access the member content absorption nodes 125. For example, in a metro area, such as San Francisco, Calif., a plurality of content absorption nodes may be distributed throughout the metro area such that an autonomous mobility implementation may be within achievable distances one or more content absorption nodes 125.

Generally, the member content absorption nodes 125 may function to optimize computational tasks, storage bytes, and networking bandwidth for autonomous mobility implementations within a local environment. Each of the member content absorption nodes 125 may be specifically configured to perform a plurality of content management actions including scheduling data collection (e.g., via a local scheduler module 127) for each of the plurality of autonomous mobility implementations 110, prioritizing or scheduling data extraction (e.g., order of data upload) from an autonomous and/or mobile implementation to a respective content absorption node 125, supplying power from the content absorption node 125 to a respective autonomous mobility implementation 111, providing network connectivity and/or connection to the autonomous mobility implementations 110, and handling the extracted data including performing analysis and computations of the extracted data (e.g., compression, etc.).

Additionally, each of local content absorption nodes 125 may implement one or more trained machine learning algorithms that function to automatically identify salient and/or useful data elements from content extracted from an autonomous and/or mobile implementation 110. Specifically, the machine learning algorithm may be trained use sensor data and/or platform data obtained from the plurality of autonomous mobility implementations 110 and/or associated platforms operating the autonomous mobility implementations 110.

At a local content absorption node 125, the node 125 may collect data content from an autonomous and/or mobile implementation 110 and analyze the collected data using the trained machine learning algorithm(s) to classify data elements of the corpus of collected and to determine a computing process that may be applied to data elements of the corpus of data collected by the node 125. In particular, the trained machine learning algorithm may function to detect data elements that should be maintained for storage or deleted from the corpus of collected data. The trained machine learning algorithm may additionally suggest a compute operation to be applied to data elements that may be maintained by the system 100 for some purposes including and beyond storage. For instance, the trained machine learning algorithm may function to suggest a type of compression to be applied to a selected set of data elements prior to transmitting the set of data elements upstream to a regional or global analysis cloud presence, external system (e.g., external requester), and the like.

Each of the local content absorption nodes 125 (as well as each of the regional and global analysis clouds) may employ any suitable machine learning including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in identifying meaningful or useful data elements within a large volume of autonomous mobility data via system 100.

Each of the local content absorption nodes 125 may be implemented by one or more computing servers having one or more computer processors (e.g., graphics process units (GPU), tensor processing unit (TPU), central processing units (CPUs, MCUs, etc.), or a combination of web servers (e.g., public servers) and private servers) that may also function to implement one or more machine learning algorithms. The member local content absorption nodes may be networked to each other as well as networked to disparate instances of local content absorption nodes.

The implementation of the local content absorption nodes 125, the regional cloud 130, and the global analysis cloud 140 in combination function to enable the system 100 to perform analyses on any parameter of interest on temporal and instantaneous time scales, either locally, regionally, or globally.

The plurality of autonomous mobility implementations 110 may include an autonomous vehicle 110 that is preferably a fully autonomous vehicle, but may additionally or alternatively be any semi-autonomous or fully autonomous vehicle; e.g., a boat, an unmanned aerial vehicle, a driverless car, etc. Additionally or alternatively, the vehicle 110 may be a vehicle that switches between a semi-autonomous state and a fully autonomous state (or a fully-manned state) and thus, the vehicle 110 may have attributes of both a semi-autonomous vehicle and a fully autonomous vehicle depending on the state of the vehicle 110. While some portions of the embodiments of the present application are described herein as being implemented via an autonomous mobility implementation 110 (e.g., an autonomous vehicle, a semi-autonomous, a drone, or the like), it shall be noted that any suitable computing device (e.g., any edge device including mobile computing devices, etc.) may be implemented to process sensor data of an autonomous mobility implementation 110.

Sensor data of the plurality of the autonomous implementations 110 is preferably raw data collected from one or more sensors of an autonomous mobility implementation 110, but can be any suitable form of data derived from sensors of the autonomous mobility implementation 110. Raw data shall be understood to mean data that is a lossless representation of all information collected by a sensor or sensors; accordingly it may be in any suitable lossless format. Alternatively, the sensor data can be compressed, derived data (e.g., derivative messages based on sensor data), compounded or combined data (e.g., fused data from multiple sensors, point clouds, feature parameters, object parameters, detected gradients, changes between sequential image frames, errors between a predetermined data model and actual measured data, classification of a data type, detected anomalies above a baseline, etc.), compressed data (e.g., using lossless or lossy compression), data segments, or any other suitable data. Sensor data can additionally or alternatively be down-sampled. Derivative (e.g., derived) data can be specified and/or determined based on a remote request (e.g., specified processing module is activated, and a processing method specified in the remote request is applied to sensor data to generate the derived data), based on predetermined rules (e.g., always determined, and then stored and/or discarded), based on an application or client (e.g., wherein an on-board or remote third-party application associated with the vehicle requests certain types of derivative data), or determined in any suitable manner.

Sensor data can originate from a sensor suite 150 that includes any suitable sensors (e.g., interior or exterior on-board sensors, external sensors, etc.). Such sensors include embedded sensors, GPS systems, LiDAR, radar, cameras, audio sensors, temperature sensors, pressure sensors, position sensors, velocity sensors, timers, clocks, and any other suitable sensors. The data can be of any suitable type, including: image data, audio data, one-dimensional data (e.g., voltage, current), multi-dimensional data (e.g., point cloud, heatmap, functional surface, other 2D or 3D data, etc.), and/or time series.

All or some of the processes described herein are preferably performed by one or more of a local content absorption node of the system 100 in cooperation with an autonomous mobility implementation system, but can alternatively be performed entirely by the local content absorption node or any other suitable system.

If the autonomous mobility implementation 110 includes a vehicle system, the vehicle system may be an onboard computer (e.g., a vehicle computer integrated with the vehicle), but can additionally or alternatively be decoupled from the vehicle (e.g., a mobile device within the vehicle). An onboard computer of the vehicle system may function to control an autonomous vehicle. The onboard computer is preferably coupled to a sensor suite (e.g., computer vision system, LIDAR, wheel speed sensors, GPS, etc.) and processes sensed data from the sensor suite and/or other sensors in order to determine the state of the autonomous vehicle; and, based upon the vehicle state and programmed instructions, the onboard computer preferably modifies or controls behavior of the autonomous vehicle. The onboard computer is preferably a general-purpose computer adapted for I/O communication with vehicle control systems and sensor systems, but may additionally or alternatively be any suitable computing device. The onboard computer is preferably connected to the Internet via a wireless connection (e.g., via a cellular data connection). Additionally or alternatively, the onboard computer may be coupled to a number of wireless or wired communication systems.

The vehicle system includes a processing system (e.g., graphical processing unit or GPU, central processing unit or CPU) as well as memory. The memory can be short term (e.g., volatile, non-volatile, random access memory or RAM, etc.) and/or long term (e.g., flash memory, hard disk, etc.) memory. The vehicle system can also include a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, or any other suitable wired data communication system or protocol), sensors, and/or a data transfer bus (e.g., CAN, FlexRay). The remote computing system can include a user device (e.g., a mobile phone, a laptop, etc.), a remote server, a cloud server, or any other suitable local and/or distributed computing system remote from the vehicle. The remote computing system is preferably connected to the vehicle system through one or more data connections (e.g., channels), but can alternatively communicate with the vehicle system in any suitable manner.

2. Method for Implementing an Intelligent Content Absorption Network

As shown in FIG. 2, a non-limiting example of the method (200, 300, 500) for implementing an intelligent content absorption network includes generating a data transmission prioritization schedule S210, selectively identifying a disposition for data elements or data segments of the collected data content an autonomous mobility implementation S220, transforming the selected data elements of the collected data S230, and selectively identifying a disposition for data elements or data segments of the collected data content an autonomous mobility implementation S240. The method may optionally include receiving a prioritization request S215.

S210, which includes generating a data transmission prioritization schedule, functions to generate a data transmission prioritization schedule that defines or informs an order for which an autonomous mobility implementation transfers data to a local content absorption node. Specifically, the data transmission prioritization schedule preferably dictates when, how, and in what type of format sensor data of the autonomous mobility implementation is transferred to the local content absorption network. The data transmission prioritization schedule can be generated based on: the prioritization model (e.g., generated as described below; e.g., S310, S520, etc.), backhaul operation parameters (e.g., current QoS metrics, node operation characteristics, etc.), or any other suitable information.

In a first implementation, a local content absorption node may function to dynamically and/or selectively generate the data transmission prioritization schedule. In this first implementation, a generation of the data transmission prioritization schedule by the local content absorption node may be triggered by one or more requests from one or more of a regional cloud and/or global analysis cloud or any suitable request source or superior source. The request may indicate a requirement for specific (sensor) data obtained by one or more sensors of the autonomous mobility implementation during a course of operation and thus, may trigger a prioritization of the specific data by the local content absorption node.

During a content absorption session in which an autonomous mobility implementation physically or wirelessly interfaces with the local absorption node, the local absorption node may transmit the data transmission prioritization schedule to the autonomous mobility implementation. That is, at a time at which the local content absorption network and the autonomous mobility implementation are physically or otherwise actively/operatively connected, the local content absorption network may push the data transmission prioritization schedule to the autonomous mobility implementation. The data transmission prioritization schedule may function to enable an autonomous mobility implementation executing the prioritization schedule to perform selective prioritizing of on-board (sensor) data and the transmission the on-board data according to the schedule to the local content absorption node.

In a second implementation, the autonomous mobility implementation may function to generate a data transmission prioritization schedule based on one or more predetermined prioritization rules, data requests from a remote platform or third party applications or users, and the like (e.g., prioritization factors, etc.).

In the circumstance where there is a conflict between a data transmission prioritization schedule of the local content absorption network and a data transmission prioritization schedule of the autonomous mobility implementation, the data transmission prioritization schedule if the local content absorption node may supersede that of the autonomous mobility implementation.

In some embodiments, prioritizing the sensor data functions to determine the importance of the received sensor data and schedule sensor data for ingestion and/or transmission. Prioritizing sensor data preferably includes determining a prioritization scheme, and then prioritizing the sensor data according to the determined prioritization scheme. Prioritizing the sensor data is preferably performed by a prioritization module of the vehicle system, but can alternatively be performed by any suitable portion or module of the autonomous mobility system. Prioritizing the sensor data can be based on characteristics of the sensor data itself (e.g., block size, packet content, compressibility, type, etc.), a prioritization request (e.g., a remote query that specifies a type of data or combination of data), an internal criterion (e.g., time of day, preset schedule, etc.), sensor data analysis (e.g., by the system, a third-party application executing on the vehicle, etc.), derivative data (e.g., recognized object classes), and/or any other suitable criteria. Prioritizing sensor data can additionally or alternatively include rule-based prioritization, prioritizing based on data classification, prioritizing based on heuristics, and prioritizing based on probability and/or stochasticity. Data being prioritized can include: signal streams and/or sources (e.g., signals from a specific sensor), signal types (e.g., all images, signals from a type of sensor, object vectors in 3-D space, etc.), signals with specific characteristics (e.g., signals matching a specified pattern), or any other suitable signals or data.

Determining the prioritization scheme functions to establish the criteria against which the sensor data is prioritized. For example, the prioritization scheme specifies the rules used to determine the priority (e.g., importance), a piece of data should have. Determining the prioritization scheme can be based on a remote query (e.g., a remote query specifies a prioritization scheme or range of possible priorities for each application), the data contents (e.g., the data type, the data values, etc.), a predetermined set of rules, or otherwise determined. The prioritization scheme can be determined automatically (e.g., trained on historical data priorities, such as for contexts with similar data parameters), manually (e.g., specified by a remote query), extracted from a remote query (e.g., a remote query specifies operations level data should be prioritized over application level data, but internally derived parameters prevent the remote query from overriding critical data having the highest prioritization level), or otherwise determined. The prioritization scheme can be determined based on categorical rules, data message or block size, data compressibility, a remote query, or any other suitable basis for prioritization. The prioritization scheme can additionally or alternatively be determined in any suitable manner.

Determining the priority can additionally include determining the priority based on a combination of a remote query and data contents. For example, determining the priority can include ranking the sensor data according to a remote query, and selectively overruling the ranking specified by the remote query according to the data category (e.g., data in the critical category is given a higher ranking than a user preference of high resolution video data).

The method can optionally include, S215, receiving a prioritization request (e.g., as a remote request, remote query, user query). The receipt of the prioritization request may occur at any point including before, during, or after the interfacing of the autonomous mobility implementation and the local content absorption node. Receiving a prioritization request functions to provide input from a user requesting sensor data and/or message data with particular characteristic(s). Prioritization requests are preferably received from a regional and/or global analysis cloud, but can additionally or alternatively be received from a remote computing system or a local computing system (e.g., a vehicle operation module) of the autonomous mobility implementation, application, operator (e.g., as defined rules), or any other suitable source. Prioritization requests are preferably generated in a cloud computing environment (e.g., regional cloud, global analysis cloud, etc.), but can alternatively be generated at the autonomous mobility implementation or any other suitable location.

Additionally, prioritization requests can include requests for one or more data types, the prioritization scheme to be used (e.g., rules, data classes, weight function, ordering ranking of sensor data types from most to least important, etc.), data processing method (e.g., signal fusion algorithms), secondary data storage parameters (e.g., which data to be stored, sampling frequency of various data types, etc.), and any other suitable requests. It shall be understood that users (e.g., sources of a remote request) can include individuals (e.g., inside the vehicle, outside the vehicle), an external application (e.g., running on a remote server, a mobile device, in the cloud, etc.), an internal application (e.g., running on the vehicle computing system), another autonomous mobility implementation, an internal or remote database server, or any other suitable generator of queries.

S220, which includes selectively identifying a disposition for data elements or data segments of the collected data content of an autonomous mobility implementation, preferably includes at a local content absorption node, collecting data content from the autonomous mobility implementation and determining a disposition of a plurality of disposition options for the data elements of the collected data content. Collecting the data content from the autonomous mobility implementation may include receiving the data content according to a transmission prioritization schedule and/or the like.

In one embodiment, a local content absorption node evaluating the collected data content functions to selectively identify data elements or segments that the local content absorption node may be instructed or otherwise, programmed to maintain for longer term storage at a remote cloud or similar storage (e.g., regional cloud, global analysis cloud, etc.). The instructions to the local content absorption node may include priority or importance instructions from the autonomous mobility implementation, an upstream regional cloud, a third-party request, some combination of the foregoing, and/or the like.

In such embodiment, a disposition of the selected data elements may include maintaining the identified or selected data elements and also, performing a compute operation against the selected data elements, such as a compression operation to reduce a size of data file for the data elements prior to transmitting the data elements, as discussed further in S240. Accordingly, the local content absorption node may function to identify a compression scheme (e.g., lossless, lossy, no compression, intelligent compression, etc.) to apply to the selected data elements based on a determined importance, priority of the data elements, storage preferences, etc.

Optionally, S225, in some embodiments functions to apply one or more content identification algorithms against the collected input data. The one or more content identification algorithms may include platform algorithms, third-party algorithms, trained machine learning algorithms, and/or the like that function to identify data elements that are useful for additional and/or further operations (beyond the autonomous mobility implementation) and preferably should be maintained for storage (or transmission to requesting source or the like) by the local content absorption node.

In such embodiment, the one or more algorithms may function in a multi-pass configuration that enables the local content absorption node to flag data elements that are to be maintained or to be deleted as the collected content data passes through each filter or algorithm of the one or more algorithms.

Accordingly, S220 may function to assign a disposition to data elements of the collected data content based on one or more algorithms, predetermined instructions or requests, predetermined rules, and/or the like. Accordingly, if data elements are not assigned a positive disposition status, such as maintain, maintain and compress, or the like, S230 may function to use the local content absorption node to delete the unselected data elements. The deletion of the selected data content from the autonomous mobility implementation reduces an amount of data that must be transmitted to a remote storage thereby improving computing and data storage efficiencies.

S230, which includes processing the selected data elements of the data corpus or collected data, functions to convert the collected data into a suitable format for transmission and/or storage according to a determined disposition. In some embodiments, S230 functions to apply a transformation and/or data compression technique to selected data elements prior to transmitting the data elements to a downstream data collection and/or processing source (e.g., a regional cloud service or the like).

Accordingly, S230 functions to select and apply an optimal compression technique and/or data processing technique to the selected data elements of the collected data. Once the optimal compression technique and/or data processing technique is applied to the selected data elements, S240 may function to transmit the processed data to a downstream destination as input, for long-term, and/or for use. In a preferred embodiment, the downstream destination includes a regional cloud center or service having greater storage and compute capabilities than the local content absorption node.

Additionally, or alternatively, the transformation and/or compression operation may be performed at either the local content absorption node or at one or more autonomous implementations with available computer resource. In some embodiments, the compression task may be partitioned or split between a local content absorption node and the autonomous mobility implementation. Accordingly, S210 may function to revert some or all of the data elements identified for compression and storage to the subject autonomous mobility implementation or to other autonomous mobility implementations having availability or capacity (e.g., in a non-operation state, such as charging or parked states, etc.) to perform compression or other compute operations against the data elements.

Figure 3:
FIG. 3 illustrates an example of the method in accordance with one or more embodiments of the present application relating to autonomous vehicles.

2. Method for Implementing an Intelligent Content Absorption Network with Autonomous Vehicles As shown in FIG. 3, a non-limiting example of the method illustrating one embodiment for implementing an intelligent content absorption network with autonomous vehicles includes generating a prioritization model S310, training the prioritization model on a data corpus to generate a prioritization schedule S320, deploying the prioritization schedule to one or more autonomous vehicles S330, offloading data at a local content absorption node S340, processing data at the local content absorption node S350, and optionally transmitting data results from the processed data S360.

S310, which includes generating a prioritization model, functions to generate a data transmission prioritization model that defines a task or process to be executed within the network. In some embodiments, the prioritization model is generated based on user specifications or an application to be deployed within an autonomous vehicle and/or network. For example, a user may specify that an application is to be deployed in the network based on given constraints of cost, urgency, and number of resources required. The user also may specify that the application is to be deployed within a certain regional cloud. The system generates a prioritization model based on these constraints that builds up a set of hierarchical information around what tasks need to be performed, which vehicles should be deployed and to where, how long they should collect data to complete the primary task or process, if and when vehicles should return to a charging station for processing and offloading of collected data, and more. In some embodiments, the prioritization model is generated according to an optimization of the given constraints, such as in terms of least computational resources spent over time. In some embodiments, the prioritization model is a machine learning model that is trained on the constraints as well as a set of data related to past or historical constraints and tasks to be performed.

S320, which includes training the prioritization model on a data corpus to generate the prioritization schedule, functions to establish a prioritization schedule that governs when and how given resources are to be deployed within the system. In some embodiments, the data corpus is a set of data that has been collected and/or tagged by one or more autonomous vehicles. In some embodiments, the data corpus includes image data from one or more cameras placed in or on a vehicle. In some embodiments, the data corpus includes factors for prioritization, such as user privacy factors, availability of resources, cost of resources, and usefulness or effectiveness of centralized learning methods. Many other factors can be contemplated for training the prioritization model to generate the prioritization schedule within an autonomous vehicle network.

S330, which includes deploying the prioritization schedule to one or more vehicles, functions to deploy the determined schedule to a vehicle or multiple vehicles within a fleet or within an autonomous vehicle network in order to carry out the given primary task. In some embodiments, the deployment of the prioritization schedule includes deploying the autonomous vehicles to collect data related to the primary task within a specific geographical location. In some embodiments, the deployment of the prioritization schedule includes one or more vehicles returning to a local content absorption node to recharge the vehicle's batteries, offload collected data into a local cloud repository, and process the collected data.

S340, which includes offloading the collected data at a local content absorption node, functions to provide for a way to transfer the collected data from the vehicle to a more long-term storage solution. For example, vehicles may typically return to a base station to recharge batteries one to three times per day. During the recharging time, the vehicles can take advantage of data uploading that is far faster and more efficient than offered during the vehicles' remote operation with access only to 4G or 5G networks. In some embodiments, the offloading is performed via wi-fi, cell network, or other way to facilitate data transfer within a local network.

S350, which includes processing data at a local content absorption node, functions to provide post-processing of collected data or transformation of collected data into a format that can be sent or read by one or more users, applications, or devices, as described above with regard to S230. In some embodiments, the processing is performed at a local content absorption node, which can provide computational resources needed for the processing.

S360, which includes transmitting data results from the processed data S360, functions to send on results obtained from the processed data to one or more user, applications, devices, or the like.

A non-limiting example use case of the method follows. Anne has lost her pet dog in San Francisco. She decides to use a "dog finding" application in conjunction with a fleet of autonomous vehicles on demand to attempt to locate her dog. Upon Anne submitting the request through a user interface, the system creates a prioritization model that will relate to the primary task of finding Anne's dog. The system takes in a set of constraints that Anne has specified or that the system accepts as default constraints, and also takes in several pictures of Anne's dog that she has uploaded to the system. A model is created based on the constraints according to S310, and that model is trained according to S320 by feeding the model a data corpus including the several pictures of Anne's dog. Based on that training, the system creates a prioritization schedule that governs how to deploy the resources of the network to execute the dog finding task.

Once the prioritization model is created, the system deploys the model within a subset of the fleet of autonomous vehicles according to S330. The system deploys a selection of the autonomous vehicles from the fleet that are located in the San Francisco area to attempt to locate the dog, having been trained on pictures of the dog. The deployment is governed by the prioritization schedule. Once deployed, the autonomous vehicles collect data related to the dog finding task. The vehicles may return a match or a set of matches while being deployed within San Francisco. The vehicles may also not return any match but may return to a local content absorption node, such as a base station or charging station, in order to recharge, process data. and/or offload data according to S340. In one embodiment, Anne is alerted or notified that her dog has been found. In another embodiment, Anne is alerted or notified that there are multiple different matches. which require post-processing in order for Anne to view them. If Anne agrees that she would like to view the potential matches, then the system processes the data at the local content absorption node according to 350. The system then transmits the data results—i.e., the potential matches for Anne's dog—to Anne for her viewing and, potentially, her further action, such as choosing one of the matches as a positive identification for her dog.

Figure 5:
FIG. 5 illustrates an example of the method in accordance with one or more embodiments of the present application relating to resource analysis.

4. Method for Implementing Resource Analysis in an Intelligent Content Absorption Network As shown in FIG. 5, a non-limiting example of the method illustrating one embodiment for implementing resource analysis in an intelligent content absorption network includes receiving a resource analysis request including constraints S510, generating a prioritization schedule based on the constraints S520, executing a deployment simulation to generate resource analysis results S530, processing resource analysis results S540, and transmitting the processed resource analysis results S550.

S510, which includes receiving a resource analysis request including constraints S510, functions to receive a request from a user, application, device, or similar for analysis relating to potential deployment of resources within an intelligent content absorption network. In some embodiments, a user utilizes a user interface to submit a request for an estimate or analysis of available resources needing to be used or deployed in order for a given task or process to be performed within the network. For example, a developer of an application may wish to submit a request to learn about the cost expenditure involved in deploying the application within the network. The developer also may wish to know, e.g., the number of vehicles that must be deployed, the areas the vehicles must be deployed to, the average amount of time each vehicle will be deployed for, when the vehicles will need to recharge battery power and at what locations, and more. A wide variety of analysis information can be contemplated.

In some embodiments, constraints can include: choosing a data stream from a number of data streams; specifying a data set or data sets for the task to be performed against; specifying a set amount of data for the task to be performed with; specifying a set amount of time for the task to be performed or attempted; specifying that collected data should be only used if it is still a certain amount of time since collection below a threshold amount of time (e.g., use data that is only half a day old); filtering by geographical area or locality; and specifying a minimum spend for the task to be deployed, or maximum spend. Many more constraints can be contemplated. In many potential embodiments, any one of such criteria can have a significant impact on overall scheduling and computational resource expenditure.

S520, which includes generating a prioritization schedule based on the above-mentioned constraints, functions to generate a deployment schedule for deploying resources, as described above.

S530, which includes executing a deployment simulation to generate resource analysis results, functions to execute a simulation of the deployment of various resources within the network based on the generated deployment schedule. In some embodiments, the simulation analyzes the use of computational and other resources, estimates processing times and expenses for given tasks and subtasks, finds optimal routes for vehicles within the network to collect data, and more. In some embodiments, the simulation is similar to unsimulated deployment of resources based on the deployment schedule, with the exception of not executing deployment of any resources.

In some embodiments, generating resource analysis results comprises generating a cost analysis or estimated expenditure of money and/or data based on the resource analysis request and constraints. In some embodiments, S540, which includes processing resource analysis results, functions to execute post-processing of the resource analysis results as described above with regard to S230.

S550, which includes transmitting the processed resource analysis results, functions to send the results of the resource analysis to one or more users, applications, devices, or the like. In some embodiments, the processed resource analysis results are transmitted to the user or device associated with the resource analysis request. In some embodiments, the results are displayed within a user interface for the user associated with the resource analysis request to access and view. In some embodiments, the resource analysis results are presented in the form of a graph, chart, pictorial, video, or some other form of visual information that a user can view and understand in a visually informative or appealing fashion.

A non-limiting example is provided herein to illustrate one potential embodiment of method. Continuing with the "dog finder" application in the above example, a developer of the application, Dan, wishes to know how much money it would cost to deploy the application in a fleet of autonomous vehicles under several different circumstances. The first trial circumstance he would like to understand the costs for is his friend Anne losing her dog in San Francisco. Dan first logs into the cloud service that allows him to deploy his application within a fleet of vehicles. He enters in information relating to the deployment he desires, and chooses his dog finding application which he has previously verified within the system. He picks a data stream from a list of available data streams. In this case, the data stream he chooses is a geographical area, namely, the San Francisco Bay Area. He selects a further option to narrow the search to the area of San Francisco and no further, and selects an even further option of searching in the neighborhood where Anne lives primarily and most heavily. He is given several different options to filter and constrain his hypothetical deployment. Through selecting from these options, he chooses five hours of data collection by the vehicles for the task of finding Anne's lost dog. He selects a further option to constrain the relevance or freshness of the collected data to less than a day old; if any data is older than that, then it is to be discarded. He selects a maximum expenditure ceiling of $300 such that the system cannot allocate more than that amount to the overall spend of the deployment. Finally, he specifies that if a strong match is found, Anne should be alerted immediately with images or video of the matching dog, while less certain matches can wait until the data is offloaded at a recharging station. He then submits this resource analysis request including the constraints above.

The system then receives the request and generates a prioritization schedule based on the constraints. The prioritization schedule includes a model of the primary task which is trained on previous dog finding searches from the application, under as similar circumstances as can be retrieved. A deployment simulation is executed based on the prioritization schedule, directing a subset of vehicles from the fleet of vehicles to search in areas around San Francisco such that there is no search overlap and that the most ground is covered in the least amount of time and expense, with extra emphasis and coverage in the neighborhood where Anne lives. The deployment simulation allocates processing and vehicle resources in consideration of the maximum expenditure of $300 that Dan has specified. The simulation includes five hours of data collection by the vehicles, including two trips per vehicle to recharging stations, one halfway through and one at the end of the search. In the simulation, the collected data is offloaded during these recharging sessions and processed as well as transformed into an ordered list with the most promising potential matches first.

The results of the simulation are further processed as resource analysis results for the developer Dan, and transmitted to him through the user interface with a granular amount of information relating to expense, computational expenditure of various aspects of the deployment, optimal recharging times, frequency, and locations, and more. Dan sees that the simulation has run in a satisfying way while keeping the expense under $300. He sends an approval to deploy the application among the fleet of vehicles for beta customers' dog finding needs in San Francisco, having gained substantial insight into what to reasonably expect from the application being deployed in the San Francisco area.

One or more instances of the method and/or processes described herein can be performed asynchronously (e.g., sequentially), concurrently (e.g., in parallel), or in any other suitable order and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method for vehicle resource analysis, the method comprising:
    receiving a resource analysis request about deploying resources within a network including one or more constraints related to resources of one or more vehicles;
    generating a prioritization schedule based on the constraints that defines an order for transferring sensor data acquired by the one or more vehicles to a local content absorption node within the network, wherein the constraints include how to offload the sensor data and perform one or more tasks in relation to the sensor data;
    executing a deployment simulation to generate resource analysis results by:
        simulating i) deployment of the one or more vehicles to collect data within a geographic area of the network based on the prioritization schedule and ii) processing of the collected data based on the prioritization schedule to generate the analysis results as an indication about a use of computational resources, estimates of processing times, routes for the one or more vehicles, and expenses associate with tasks; and
    transmitting the resource analysis results to one more devices associated with the resource analysis request.

2. The method of claim 1, wherein the resource analysis results comprise a cost estimate for computational resources based on the resource analysis request, and
    wherein the constraints include aspects of deploying the resources that affect scheduling and computational resource expenditure.

3. The method of claim 1, wherein generating the prioritization schedule includes generating a deployment schedule for deploying the resources.

4. The method of claim 1, wherein at least one of the constraints comprises a specified geographical area.

5. The method of claim 1, wherein at least one of the constraints comprises a time frame for data collection.

6. The method of claim 1, wherein at least one of the constraints comprises a maximum and/or minimum spend.

7. The method of claim 1, wherein at least one of the resource analysis results comprises a location to offload data.

8. The method of claim 1, wherein the deployment simulation comprises: simulating offloading one or more data elements from the collected data at a
    local content absorption node, wherein the local content absorption node is different from a remote data center.

9. The method of claim 1, further comprising:
    receiving one or more adjustments to the resource analysis request; and
    re-executing the deployment simulation to generate resource analysis results based on the one or more adjustments to the resource analysis request.

10. The method of claim 1, wherein the deployment simulation is executed on one or more autonomous vehicles in a fleet of autonomous vehicles.

11. The method of claim 1, wherein the generating the prioritization schedule comprises optimizing for lowest data computation expenditure based on the constraints.

12. A system for vehicle resource analysis,
    the system comprising:
    a plurality of autonomous mobile vehicle implementations;
    a global analysis cloud; and
    a computing system comprising a scheduling module, a simulation module, and a processing module, wherein the computing system further comprises one or more computer processors and a non-transitory medium comprising computer-executable instructions that, when executed by the one or more computer processors, implement steps of:
    receiving a resource analysis request about deploying resources within a network, including one or more constraints related to resources of one or more vehicles;
    generating a prioritization schedule based on the constraints that defines an order for transferring sensor data acquired by the one or more vehicles to a local content absorption node within the network, wherein the constraints include how to offload the sensor data and perform one or more tasks in relation to the sensor data;
    executing a deployment simulation to generate resource analysis results by:
    simulating i) deployment of the one or more vehicles to collect data within a specified geographic area of the network based on the prioritization schedule and ii)

processing of the collected data based on the prioritization schedule to generate the analysis results as an indication about a use of computational resources, estimates of processing times, routes for the one or more vehicles, and expenses associate with tasks; and transmitting the resource analysis results to one more devices associated with the resource analysis request.

13. The system of claim 12, wherein the resource analysis results comprise a cost estimate for computational resources based on the resource analysis request, and
wherein the constraints include aspects of deploying the resources that affect scheduling and computational resource expenditure.

14. The system of claim 12,
wherein generating the prioritization schedule includes generating a deployment schedule for deploying the resources.

15. The system of claim 12, wherein at least one of the constraints comprises the specified geographical area.

16. The system of claim 12, wherein at least one of the constraints comprises a time frame for data collection.

17. The system of claim 12, wherein at least one of the resource analysis results comprises a location to offload data.

18. The system of claim 12, wherein the computer-executable instructions further implement the steps of:
receiving one or more adjustments to the resource analysis request; and
re-executing the deployment simulation to generate resource analysis results based on the one or more adjustments to the resource analysis request.

19. The system of claim 12, further comprising:
processing the resource analysis results in real-time or substantially real-time.

20. The system of claim 12, wherein the computer-executable instructions further implement the steps of:
determining that the resource analysis results do not exceed a predefined threshold of computational expenditure; and
deploying a set of computational resources according to the deployment simulation.

* * * * *